(12) United States Patent
Usie

(10) Patent No.: US 10,079,828 B2
(45) Date of Patent: Sep. 18, 2018

(54) CCTV MONITORING SYSTEM FOR REGISTERING CAMERA AND MANAGING PERMISSION AND CONTROL METHOD THEREOF

(71) Applicant: CHeKT LLC, Shreveport, LA (US)

(72) Inventor: Wesley Robert Usie, Shreveport, LA (US)

(73) Assignee: CHeKT LLC, Shreveport, LA (US)

( * ) Notice: Subject to any disclaimer, the term of this patent is extended or adjusted under 35 U.S.C. 154(b) by 124 days.

(21) Appl. No.: 15/203,446

(22) Filed: Jul. 6, 2016

(65) Prior Publication Data

US 2018/0013760 A1    Jan. 11, 2018

(51) Int. Cl.
| | |
|---|---|
| H04N 7/18 | (2006.01) |
| H04L 29/06 | (2006.01) |
| H04N 5/232 | (2006.01) |

(52) U.S. Cl.
CPC ...... *H04L 63/0869* (2013.01); *H04L 63/0876* (2013.01); *H04L 63/126* (2013.01); *H04N 5/23206* (2013.01); *H04N 7/18* (2013.01)

(58) Field of Classification Search
CPC .......... H04N 7/181; H04N 7/183; H04N 7/18; H04N 7/188; G08B 13/19656
USPC ....................................................... 348/143
See application file for complete search history.

(56) References Cited

U.S. PATENT DOCUMENTS

| | | | | |
|---|---|---|---|---|
| 7,370,087 B1* | 5/2008 | O'Toole, Jr. | .......... | H04L 67/025 709/217 |
| 7,733,371 B1* | 6/2010 | Monroe | ........... | G08B 13/19628 348/143 |
| 2006/0136575 A1* | 6/2006 | Payne | ................ | G07C 9/00087 709/219 |
| 2008/0288986 A1* | 11/2008 | Foster | .............. | G08B 13/19656 725/62 |
| 2008/0303903 A1* | 12/2008 | Bentley | ............ | G08B 13/19606 348/143 |
| 2009/0015671 A1* | 1/2009 | Addy | ...................... | H04N 7/181 348/143 |
| 2010/0135643 A1* | 6/2010 | Fleming | ............... | G11B 27/034 386/224 |
| 2011/0199484 A1* | 8/2011 | Uchihara | ............... | H04N 5/232 348/143 |

(Continued)

OTHER PUBLICATIONS

Liu et al, Real-time video surveillance for large scenes (Year: 2011).*

(Continued)

*Primary Examiner* — Shan E Elahi
(74) *Attorney, Agent, or Firm* — Heedong Chae; Lucem, PC

(57) ABSTRACT

The present invention provides a CCTV monitoring system for registering a camera and managing permission, and a control method of the system. In other words, according to the present invention, a manager having an installer terminal granted with temporal authority over the camera, can install the relevant camera, check whether the camera operates, and then, entrust/set authority over the camera to a terminal of an end-user through cooperation among the installer terminal, the terminal of the end-user, and a service server. Accordingly, convenience for a user can be improved and it is possible to more efficiently manage an installed camera.

7 Claims, 6 Drawing Sheets

(56) References Cited

U.S. PATENT DOCUMENTS

2012/0297461 A1* 11/2012 Pineau .............. G07C 9/00103
                                                          726/4
2016/0249018 A1*  8/2016 Newton ............. H04L 12/4641

OTHER PUBLICATIONS

Raty et al, Distributing essential logical deductions to surveillance personnel and a video recorder (Year: 2008).*

* cited by examiner

| monitoring server number | monitoring server account | camera number | MAC address | activation code | authority account |
|---|---|---|---|---|---|
| 01 | ABCD | 11 | AB-12-CD-34-EF-56 | 012345 | |
| ... | ... | ... | ... | ... | ... |

FIG. 3

| monitoring server number | monitoring server account | camera number | MAC address | activation code | authority account |
|---|---|---|---|---|---|
| 01 | ABCD | 11 | AB-12-CD-34-EF-56 | 012345 | AA |
| ... | ... | ... | ... | ... | ... |

FIG. 4

| monitoring server number | monitoring server account | camera number | MAC address | activation code | authority account |
|---|---|---|---|---|---|
| 01 | ABCD | 11 | AB-12-CD-34-EF-56 | 012345 | BB |
| ... | ... | ... | ... | ... | ... |

FIG. 6

CCTV MONITORING SYSTEM FOR REGISTERING CAMERA AND MANAGING PERMISSION AND CONTROL METHOD THEREOF

BACKGROUND OF THE INVENTION

1. Field of the Invention

The present invention relates to a CCTV monitoring system for registering a camera and managing permission and a control method thereof, and particularly, to a CCTV monitoring system for registering a camera and managing permission that enables a manager having an installer terminal having temporal authority over a camera to install the camera, to check whether the camera operates, and to entrust/set the authority over the camera to a terminal of an end-user through cooperation among the installed terminal, the terminal of the end-user, and a service server, and a control method of the CCTV monitoring system.

2. Description of the Related Art

A monitoring service server monitors video information, which is obtained by a camera registered on the monitoring service server and installed in a predetermine area, and provides the video information to a terminal of an end-user.

According to this monitoring service server, when a camera is initially installed in a specific area, there is an inconvenience in that an end-user having a terminal has to be given authority over the camera through wire communication from a manager of the monitoring service server and to check the operation of the camera using a granted account.

PRIOR ART DOCUMENT

[Patent Document] Korean Patent Application Publication No. 10-2008-0044386 (titled "Real time monitoring service providing system")

SUMMARY OF THE INVENTION

An object of the present invention is to provide a CCTV monitoring system for registering a camera and managing permission that enables a manager who has an installer terminal having temporal authority over a camera to install the camera, to check whether the camera operates, and to entrust/set the authority over the camera to a terminal of an end-user through cooperation among the installed terminal, the terminal of the end-user, and a service server, and a control method of the CCTV monitoring system.

A control method of a CCTV monitoring system for registering a camera and managing permission according to an embodiment of the present invention may include: transmitting a MAC address and an activation code of a camera through a monitoring server; keeping the MAC address and the activation code of the camera in cooperation with an account related to the monitoring server through a service server; setting management authority over the camera for an installer account related to an installer terminal in cooperation with the service server through the monitoring server; connecting to the service sever on the basis of a MAC address and an activation code set in the camera through the camera, with the camera installed in a specific area; transmitting video information acquired by the camera to the service server through the camera; connecting to the service server on the basis of the installer account through the installer terminal, with the camera installed in the specific area; and checking whether the camera having management authority over the installer account operates, through the installer terminal.

As an embodiment of the present invention, the checking of whether the camera operates may include: a process of receiving video information transmitted via the service server from the camera through the installer terminal; a process of outputting the received video information through the installer terminal; and a process of performing a PTZ control function on the camera in cooperation with the service server and the camera through the installer terminal.

As an embodiment of the present invention, the method may further include: receiving account information about a terminal of an end-user to provide management authority over a camera that is temporarily set in the installer terminal as authority to the terminal of the end-user related to the area where the camera is installed, through the installer terminal; transmitting the received account information about the terminal, installer account information about the installer terminal, and authority delegation information to the service server through the installer terminal; setting management authority about the camera from an installer account related to the installer terminal to an account related to the terminal on the basis of the account information about the terminal, the installer account information about the installer terminal, and the authority delegation information, through the service server; transmitting information that the management authority over the camera has been changed from the installer terminal to the terminal, to the installer terminal and the terminal, respectively, through the service server, when management authority over the camera has been entrusted from the installer terminal to the terminal; outputting information that the management authority over the camera has been changed from the installer terminal to the terminal, which is transmitted from the service server, through the installer terminal and the terminal; connecting to the service server using the account related to the terminal through the terminal; receiving video information transmitted via the service server from the camera, through the terminal; outputting the received video information through the terminal; and performing at least one of a PTZ control function for the camera and, a search function and a test function on a plurality of pieces of video information kept in the service server in relation to the camera in cooperation with the service server and the camera, through the terminal.

As an embodiment of the present invention, the receiving of account information about a terminal may receive the account information about the terminal through any one process of user input by a manager of the installer terminal, user input by a user of the terminal, and information transmission/reception through local communication between the installer terminal and the terminal.

As an embodiment of the present invention, the setting management authority over the camera from an installer account related to the installer terminal to an account related to the terminal may keep the MAC address and the activation code of the camera in cooperation with the account related to the terminal.

A CCTV monitoring system for registering a camera and managing permission according to an embodiment of the present invention includes: a monitoring server that transmits a MAC address and an activation code of a camera and sets management authority over the camera for an installer account related to an installer terminal; the camera that is installed in a specific area, connects to a service server on the basis of the MAC address and the activation code set in the camera, and transmits video information acquired by the camera to the service server; the installer terminal that connects to the service server on the basis of the installer account and check whether the camera given management authority over the installer account operates, with the camera installed in the specific area; and the service server that keeps the MAC address and the activation code of the camera in relation to an account related to the monitoring server and sets management authority over the camera for the installer account related to the installer terminal in cooperation with the monitoring server.

As an embodiment of the present invention, the system may further include a terminal of an end-user related to the area where the camera is installed, in which the installer terminal may receive account information about the terminal of the end-user and transmit the received account information about the terminal, installer account information about the installer terminal, and authority delegation information to the service server in order to provide the management authority over the camera having temporary authority over the installer terminal to the terminal; and the service server may set the management authority over the camera from installer account related to the installer terminal to ail account related to the terminal on the basis of the account information about the terminal, the installer account information about the installer terminal, and the authority delegation information.

As an embodiment of the present invention, the terminal may connect to the service server using the account related to the terminal, output video information transmitted via the service server from the camera, and perform at least any one of a PTZ control function for the camera and, a search function and a test function for a plurality of pieces of video information kept in the service server in relation to the camera, in cooperation with the service server and the camera.

According to the present invention, a manager having an installer terminal granted with temporal authority over the camera, can install the relevant camera, check whether the camera, operates, and then, entrust/set authority over the camera, to a terminal of an end-user through cooperation among the installer terminal, the terminal of the end-user, and a service server. Accordingly, convenience for a user can be improved and it is possible to more efficiently manage an installed camera.

BRIEF DESCRIPTION OF THE DRAWINGS

FIGS. 3 and 4 are diagrams showing matching information that is kept in a service server according to an embodiment of the present invention.

FIG. 6 is a diagram showing matching information that is kept in a service server according to an embodiment of the present invention.

DETAILED DESCRIPTION OF THE PREFERRED EMBODIMENTS

Figure 1:
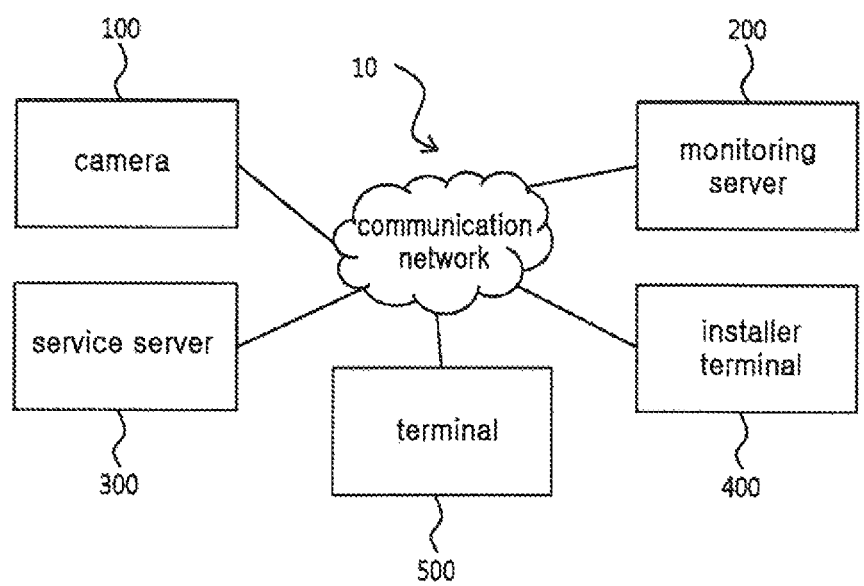
FIG. 1 is a block diagram showing the configuration of a CCTV monitoring system for registering a camera and managing permission according to an embodiment of the present invention.

It should be noted that technical terms used herein are used only in order to describe specific embodiments rather than limiting the present invention. Further, the technical terminologies used here should be construed as being generally understood by those skilled in the art unless defined as specific meanings, not construed as being excessively general meanings or excessively narrow meanings. Further, if the technical terminologies used herein are wrong technical terminologies that cannot exactly express the spirit of the present invention, they should be replaced by technical terminologies that can be correctly understood by those skilled in the art. Further, common terms used herein should be construed in accordance with dictionary definitions or contexts, not being as excessively narrow meanings.

The singular forms used herein are intended to include the plural forms as well, unless the context clearly indicates otherwise. Terms "composed of" or "include" used herein should not construed as necessarily including all of various components or various steps, but construed that they may not include some of the components or steps or may further include additional components or steps.

Further, terms including ordinal numbers such as 'first' and 'second' may be used to describe various components, but the components are not to be construed as being limited to the terms. The terms are used to distinguish one component from another component. For example, the 'first' component may be named the 'second' component, and vice versa, without departing from the scope of the present invention.

Hereinafter, embodiments of the present invention will be described in detail with reference to the accompanying drawings, like reference numerals are given to like or similar components regardless of the FIG. numbers, and repeated description is not provided.

However, in describing the present invention, detailed descriptions of well-known technologies will be omitted so as not to obscure the description of the present invention with unnecessary detail. Further, it should be noted that the accompanying drawings are provided only for easier understanding of the spirit of the present invention and should not be construed as limiting the spirit of the present invention.

FIG. 1 is a block diagram showing the configuration of a CCTV monitoring system 10 for registering a camera and managing permission according to an embodiment of the present invention.

As shown in FIG. 1, the CCTV monitoring system 10 includes a camera 100, a monitoring server 200, a service server 300, an installed terminal 400, and a terminal 500. The components of the CCTV monitoring system 10 illustrated in FIG. 1 are not all necessary components, and CCTV monitoring system 10 may be composed of components much or less than the components illustrated in FIG. 1.

The camera 100, the monitoring server 200, the service server 300, the installer terminal 400, and the terminal 500 communicate with certain internal components or at least one external terminal through a wire/wireless communication network. Here, the wireless internet technology may be WLAN (Wireless LAN), DLNA (Digital Living Network Alliance), Wibro (Wireless Broadband), Wimax (World Interoperability for Microwave Access), HSDPA (High Speed Downlink Packet Access), HSUPA (High Speed Uplink Packet Access), IEEE 802.16, LTE (Long Term Evolution), LTE-A (Long Term Evolution-Advanced), and WMBS (Wireless Mobile Broadband Service WMBS). The communication unit transmits/receives data in accordance with at least one wireless internet technology within a range including even internet technologies not stated above. Further, a local communication technology may include Bluetooth, RFID (Radio Frequency Identification), IrDA (Infrared Data Association), UWB (Ultra-Wideband), ZigBee, HFC (Near Field Communication NFC), USC (Ultra Sound Communication), VLC (Visible Light Communication), Wi-Fi, Wi-Fi Direct, and the like. Further, a wire communication technology may include PLC (Power Line Communication), USB communication, Ethernet, serial communication, and optical/coaxial cable communication.

Further, the camera 100, the monitoring server 200, the service server 300, the installer terminal 400, and the terminal 500 can exchange information with a predetermined terminal through a USB (Universal Serial Bus).

Further, the camera 100, the monitoring server 200, the service server 300, the installer terminal 400, and the terminal 500 exchange wireless signals with other devices on a mobile communication network constructed in accordance with technical standards or communication types (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), and LTE-A (Long Term Evolution-Advanced)) for mobile communication.

The camera 100 may be as IP camera/IP encoder (or a network camera).

Further, the camera 100 may be set to be registered on a service server and may be given an ID MAC (Media Access Control) address and an ID activation code in the manufacturing process of the relevant camera.

Further, the camera 100 is controlled to be installed in a specific area by the control of a manager having the relevant installer terminal 400.

Further, the camera 100 processes image frames of still images or moving images obtained by an image sensor (a camera module or a camera) in a video call mode, a photographing mode, a video conference mode, etc. That is, the camera 100 encodes/decodes relevant image data obtained by the image sensor through each codec to meet standards. The processed video frames may be displayed on a display unit (not illustrated) disposed on a side of the relevant camera 100. For example, the camera 100 takes video of an object (or a subject) (user image or a video conferee) and outputs a video signal corresponding to the obtained video (video of the subject).

Further, the image frames processed by the camera 100 may be kept in a storage unit (not illustrated) such as an SD card included in the camera 100 or may be transmitted to an external terminal (for example, including the monitoring server 200, the service server 300, the installer server 400, and the terminal 500) through a communication unit (not illustrated).

As described above, the camera 100 acquires for photographs) video information about the area (or region) where the camera 100 is installed.

Further, the camera 100 connects to the service server 300 on the basis of the MAC address and the activation code set in the relevant camera 100 with a communication network turned on.

Further, the camera 100 acquires and transmits video information to the service server 300.

The monitoring server (monitoring service provider) 200 connects to the service server 300 using an account designated to the relevant monitoring server 200.

Further, the monitoring server 200 transmits (provides) the MAC address and the activation code of the specific camera 10 to the service server 300.

Further, the monitoring server 200 sets connection permission (or management authority) for the relevant camera 100 in an installer account related to the installer terminal 400 (or the account of the installer terminal 400). Here, the installer terminal 400 may be any one of a plurality of installer terminals registered on the monitoring server 200.

That is, the monitoring server 200 sets (or grants/designates) a connection permission function (or a management authority function) for the relevant camera 100 to the installer account related to the installer terminal 400 in cooperation with the service server 300.

Further, the monitoring server 200 monitors the video information acquired by the relevant camera 100 registered on the service server 300.

As described above, the monitoring server 200 can register one or more cameras 100 on the service server 300.

Further, the monitoring server 200 can set temporal management authority over one or more cameras 100 registered on the service server 300 to the installer terminal 400 of at least one of a plurality of installer terminals registered on the relevant monitoring server 200.

The service server 300 may be a cloud server, and the like.

Further, the service server 300 provides a cloud service to one or more cameras 100, the monitoring server 200, the installer terminal 400, and the terminal 500 connected through a communication network.

Further, the service server 300 manages (or provides) an connection function for the relevant monitoring server 200 trying to connect to the service server 300 on the basis of the account designated to the monitoring server 200.

Further, the service server 300 receives the MAC addresses and activation codes of one or more cameras 100, which are managed by the relevant monitoring server 200, transmitted from the monitoring server 200.

Further, the service server 300 registers the relevant camera 100 (or the information about the relevant camera 100) on the account of the monitoring server 200 (or an account related to the monitoring server 200).

That is, the service server 300 links and keeps (or registers) the account designated to the monitoring server 200 and the MAC address and activation code of the camera 100.

Further, the service server 300 sets (or grants/designates) an connection permission function (or a management authority function) for the specific camera 100 to the installer account related to the installer terminal 400, which is managed by the relevant monitoring server 200, in cooperation with the monitoring server 200.

After the camera 100 is installed in a specific area by the control of a manager having the relevant installer terminal 400, the service server 300 manages (or provides) an connection function for the relevant camera 100 trying to connect to the service server 300 on the basis of the MAC address and activation code set in the relevant camera 100.

Further, the service server 300 receives the MAC address, activation code, and video information set in and transmitted from the camera 100.

Further, the service server 300 keeps (or manages) the MAC address, activation code, and video information set in and transmitted from the relevant camera 100.

Further, after the relevant camera 100 is installed in a specific area, the service server 300 manages (or provides)

an connection function for the installer terminal 400 trying to connect to the service server 300 on the basis of an installer account related to the relevant installer terminal 400.

Further, the service server 300 checks whether the camera 100 managed by the installer terminal 400 operates (or performs a test function) in cooperation with the installer terminal 400.

That is, when the installer terminal 400 normally connects to the service server 300, the service server 300 provides video information provided through the camera 100 managed by the installer terminal 400 to the installer terminal 400.

Further, the service server 300 checks (or performs) a PTZ control function for the relevant camera 100 in cooperation with the installer terminal 400 and the camera 100.

Further, the service server 300 communicates with the terminal 500.

Further, the service server 300 creates an account related to the relevant terminal 500 in cooperation with the terminal 500.

Further, the service server 300 receives account information about the terminal 500 (or account information of the terminal 500) transmitted from the installer terminal 400, installer account information about the installer terminal 400 (or account information of the installer terminal 400), authority delegation information (or authority delegation information about one or more specific cameras 100 selected from a plurality of cameras managed by the installer terminal 400), and the like.

Further, the service server 300 entrusts (or changes/sets) authority (management authority) related to the relevant camera 100 from an installer account related to the installer terminal 400 to an account related to the terminal 500 on the basis of the account information about the terminal 500, the installer account information about the installer terminal 400, and the authority delegation information.

In other words, the service server 300 links and keeps (registers) the account designated to the terminal 500 and the MAC address and activation code of the camera 100 on the basis of the account information about the terminal 500, the installer account information about the installer terminal 400, and the authority delegation information.

When it is failed to entrust (or set authority/change authority/entrust management authority) authority to the terminal 500 from the installer terminal 400 in relation to the camera 100, the service server 300 transmits information that it has been failed to entrust authority to the terminal 500 for the camera 100 to the installer terminal 400 and the terminal 500, respectively.

When it is completed to entrust (or set authority/change authority/entrust management authority) authority to the terminal 500 from the installer terminal 400 in relation to the camera 100, the service server 300 creates information that the management authority over the camera 100 has been changed from the installer terminal 400 to the terminal 500.

Further, the service server 300 transmits the created information that the management authority over the camera 100 has been changed from the installer terminal 400 to the terminal 500 to the installer terminal 400 and the terminal 500, respectively.

Further, the service server 300 manages (or provides) an connection function for the terminal 500 trying to connect to the service server 300 on the basis of an account related to the server 500.

Further, when the terminal 500 normally connects to the service server 300, the service server 300 provides one or more pieces of video information provided through the camera 100 managed by the terminal 500 to the terminal 500. Here, the video information includes real-time video information acquired by the camera 100 and past video information about the camera 100 kept in the relevant service server 300.

Further, the service server 300 checks (or performs) the PTZ control function for the relevant camera 100, and a search function and a test function for several pieces of video information kept in the service server 300 in relation to the relevant camera 100 in cooperation with the terminal 500 and the camera 100.

The installer terminal 400 may be a terminal registered on the monitoring server 200.

Further, the installer terminal 400 may be a terminal pertained to a manager who installs one or more cameras 100 managed by the monitoring server 200 in a specific area.

After the relevant camera 100 is installed in a specific area, the installer terminal 400 connects to the service server 300 using an installer account related to the relevant installer terminal 400.

Further, installer terminal 400 selects a specific camera 100 from a plurality of (or one or more) cameras that are given connection permission through an installer account (or the account of the installer terminal 400) in accordance with selection by a user (or touch by a user/input by a user).

Further, the installer terminal 400 checks whether the relevant selected camera 100 operates (or performs a test function) in cooperation with the service server 300.

In other words, the installer terminal 400 receives the video information acquired by the camera 100 and transmitted via the service server 300 from the camera 100 and outputs the received video information in cooperation with the service server 300.

Further, the installer terminal 400 checks (or performs) a PTZ control function for the camera 100 in cooperation with the service server 300 and the camera 100.

Further, the installer terminal 400 receives account information about the terminal 500 that the end-user has (or the account information of the terminal 500) in order to provide (or entrust/set) the management authority over the camera 100 having temporary authority over the relevant installer terminal 400 to the terminal 500 of the end-user related to the area where the relevant camera 100 is installed. At this time, the installer terminal 400 can receive the account information about the terminal 500 through user input by the manager of the installer terminal 400, user input by the user of the terminal 500, and information transmission/reception through local communication between the installer terminal 400 and the terminal 500.

Further, the installer terminal 400 transmits the received account information about the terminal 500 (or account information of the terminal 500), installer account information about the installer terminal 400 (or account information of the installer terminal 400), authority delegation information (or authority delegation information about one or more specific cameras 100 selected from a plurality of cameras managed by the installer terminal 400), and the like, to the service server 300.

When it is failed to entrust (or set authority/change authority/entrust management authority) authority to the terminal 500 from the installer terminal 400 in relation to the camera 100, the installer terminal 400 receives information that it has been failed to entrust authority to the terminal 500 for the camera 100 transmitted from the service sever 300.

Further, the installer terminal 400 outputs the received information that it has been failed to entrust the authority over the camera 100 to the terminal 500.

When it is completed to entrust (or set authority/change authority/entrust management authority) authority to the terminal 500 from the installer terminal 400 in relation to the camera 100, the installer terminal 400 receives information that the management authority over the camera 100 has been changed from the installer terminal 400 to the terminal 500 that is transmitted from the service server 300.

Further, the installer terminal 400 outputs the received information that the management authority over the camera 100 has been changed from the installer terminal 400 to the terminal 500.

The terminal 500 may be the terminal of the end-user.

Further, the terminal 500 may be a terminal for managing a specific camera 100 installed at a specific position.

Further, the terminal 500 connects to the service sever 300.

Further, the terminal 500 performs a member joining process in cooperation with the service server 300.

Further, when the member joining process has been normally performed, the terminal 500 checks an account created (issued) by the service server 300 (or an account related to the terminal 500).

When it is failed to entrust (or set authority/change authority/entrust management authority) authority to the terminal 500 from the installer terminal 400 in relation to the camera 100, the terminal 500 receives information that it has been failed to entrust authority to the terminal 500 for the camera 100 transmitted from the service sever 300.

Further, the terminal 500 outputs the received information that it has been failed to entrust the authority over the camera 100 to the terminal 500.

When it is completed to entrust (or set authority/change authority/entrust management authority) authority to the terminal 500 from the installer terminal 400 in relation to the camera 100, the terminal 500 receives information that the management authority over the camera 100 has been changed from the installer terminal 400 to the terminal 500 that is transmitted from the service server 300.

Further, the terminal 500 outputs the received information that the management authority over the camera 100 has been changed from the installer terminal 400 to the terminal 500.

Further, the terminal 500 connects to the service sever 300 using the account related to the relevant terminal 500.

Furthermore, the terminal 500 receives the video information acquired by the camera 100 and transmitted via the service server 300 from the camera 100 in cooperation with the service server 300. Here, the video information includes real-time video information acquired by the camera 100 and past video information about the camera 100 kept in the relevant service server 300.

Further, the terminal 500 outputs the received video information.

Further, the terminal 500 performs the PTZ control function for the relevant camera 100, and a search function and a test function for several pieces of video information kept in the service server 300 in relation to the relevant camera 100 in cooperation with the service server 300.

As described above, a manager having an installer terminal granted with temporal authority over the camera, may check whether the camera operates, and then, entrust/set authority over the camera to a terminal of an end-user through cooperation among the installer terminal, the terminal of the end-user, and a service server.

Hereafter, a control method of a CCTV monitoring system for registering a camera and managing permission according to the present invention is described in detail with reference to FIGS. 1 to 6.

Figure 2:
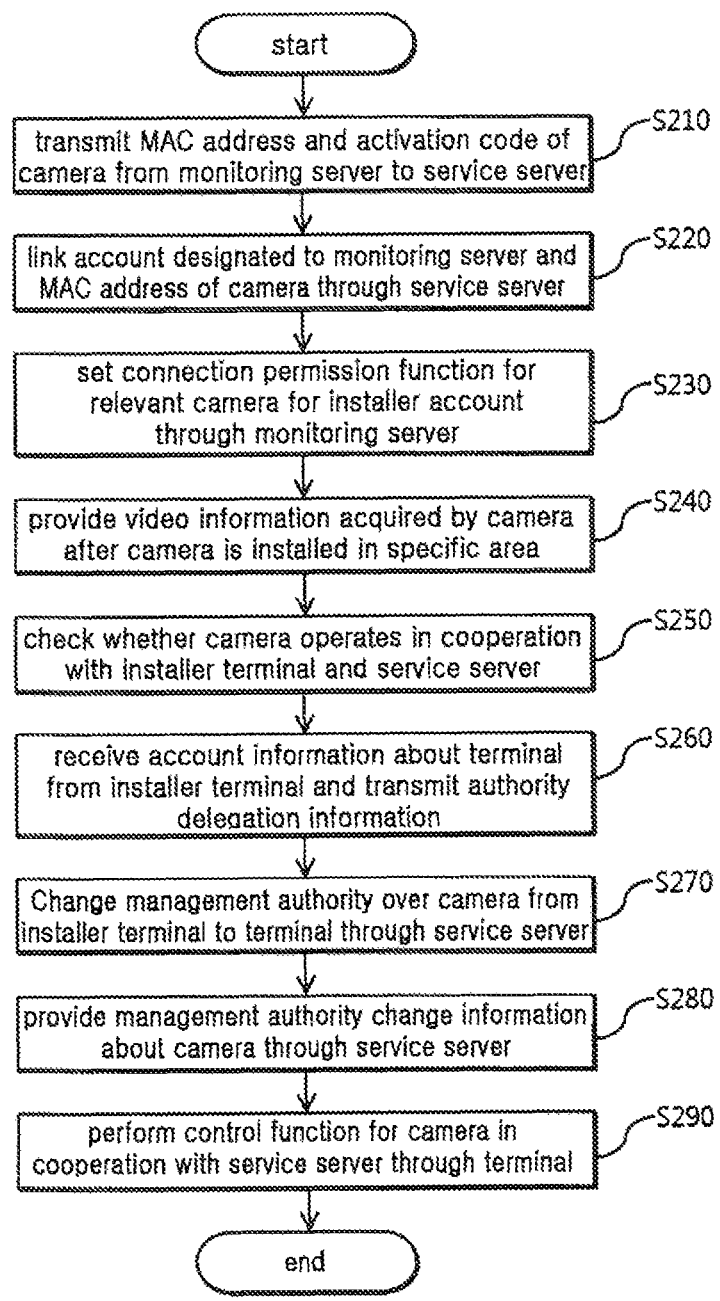
FIG. 2 is a flowchart showing a control method of a CCTV monitoring system for registering a camera and managing permission according to an embodiment of the present invention.

FIG. 2 is a flowchart showing a control method of a CCTV monitoring system for registering a camera and managing permission according to an embodiment of the present invent ion.

First, the monitor server 200 connects to the service sever 300 using an account designated to the relevant monitoring server 200.

Further, the monitoring server 200 transmits (provides) the MAC address and the activation code of the specific camera 100 to the service server 300.

For example, the first monitoring server 200 connects to the first service server 300 using an ABCD account designated to the relevant first monitoring server.

Further, the first monitoring server transmits the eleventh MAC address and the eleventh activation code about the eleventh camera 100 to the first service server (S210).

Thereafter, the service server 300 receives the MAC addresses and activation codes of the cameras 100 transmitted from the monitoring server 200.

Further, the service server 300 registers the relevant camera 100 (or the information about the relevant camera 100) on the account of the monitoring server 200 (or an account related to the monitoring server 200).

In other words, the service server 300 links and keeps (or registers) the account designated to the monitoring server 200 and the MAC address and activation code of the camera 100.

For example, the first service server receives the eleventh MAC address and the eleventh activation code related to the eleventh camera, transmitted from the first monitoring server.

Further, as shown in FIG. 3, the first service server matches the ABCD account designated to the first monitoring server and the eleventh MAC address and eleventh activation code related to the eleventh camera, and then keeps the matching information (S220).

Thereafter, the monitoring server 200 sets connection permission (or management authority) for the relevant camera 100 to an installer account related to the installer terminal 400 (or the account of the installer terminal 400). Here, the installer terminal 400 may be any one of a plurality of installer terminals registered on the monitoring server 200.

In other words, the monitoring server 200 sets (or grants/designates) a connection permission function (or a management authority function) for the relevant camera 100 to the installer account related to the installer terminal 400 in cooperation with the service server 300.

For example, as shown in FIG. 4, the first monitoring server sets management authority (or a management function/control authority/a control function/an connection permission function) over the eleventh camera to an AA installer account so that the eleventh camera can be managed (or controlled) through the AA installer account related to the first installer terminal 400, in cooperation with the first service server (S230).

Thereafter, by control of the manager having the relevant installer terminal 400, the camera 100 is installed in a specific area and then the camera 100 connects to the service server 300 on the basis of the MAC address and the activation code set in the relevant camera 100 with a communication network turned on.

Further, the camera 100 acquires and transmits video information to the service server 300.

Further, the service sever 300 receives the MAC address, activation code, and video information set in and transmitted from the camera 100 and keeps (or manages) the received MAC address, activation code, and video information set in the relevant camera 100.

For example, when an eleventh camera is installed at a specific position in a coffeehouse to acquire video of the front door of the coffeehouse, the eleventh camera connects to the first service server through a communication network on the basis of the eleventh MAC address and the eleventh activation code set in the eleventh camera. Further, the eleventh camera acquires real-time video information about the front door of the coffeehouse and transmits the acquired real-time video information to the first service server. Further, the first service server keeps the real-time video information about the front door of the coffeehouse transmitted from the eleventh camera (S240).

After the relevant camera 100 is installed in the specific area, the installer terminal 400 connects to the service server 30 using an installer account related to the relevant installer terminal 400.

Further, installer terminal 400 selects a specific camera 100 from a plurality of (or one or more) cameras that are given access permission through the relevant installer account (or the account of the installer terminal 400) in accordance with selection by a user (or touch by a user/input by a user). Further, the installer terminal 400 checks whether the relevant selected camera 100 operates (or performs a test function) in cooperation with the service server 300.

In other words, the installer terminal 400 displays the video information acquired by the camera 100 and transmitted via the service server 300 from the camera 100 and checks (or performs) the PTZ control function in cooperation with the service terminal.

For example, after the eleventh camera is installed in the coffeehouse, the first installer terminal connects to the first service server through an AA installer account related to the first installer terminal.

Further, the first installer terminal checks whether the eleventh camera given management authority over the AA installer normally operates in cooperation with the first service server (S250).

Thereafter, the installer terminal 400 receives account information about the terminal 500 that the end-user has (or the account information of the terminal 500) in order to provide (or entrust/set) the management authority over the camera 100 having temporary authority over the relevant installer terminal 400 to the terminal 500 of the end-user related to the area where the relevant camera 100 is installed. The installer terminal 400 can receive the account information about the terminal 500 from user input by the manager of the installer terminal 400, user input by the user of the terminal 500, and information transmission/reception through local communication between the installer terminal 400 and the terminal 500.

Further, the installer terminal 400 transmits the received account information about the terminal 500 (or account information of the terminal 500), installer account information about the installer terminal 400 (or account information of the installer terminal 400), authority delegation information (or authority delegation information about one or more specific cameras 100 selected from a plurality of cameras managed by the installer terminal 400), and the like, to the service server 300.

Figure 5:
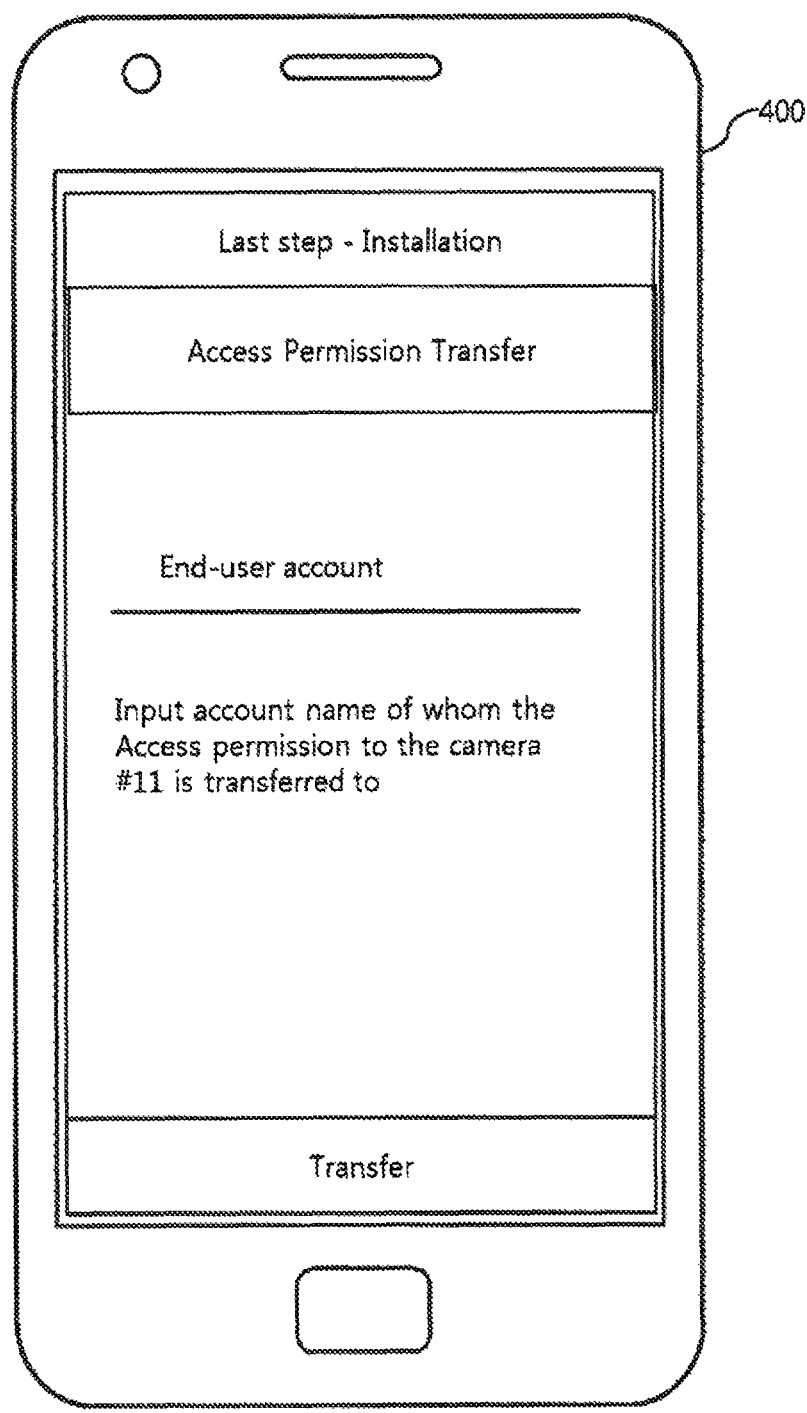
FIG. 5 is a diagram showing the screen of an installer terminal according to an embodiment of the present invention.

For example, as shown in FIG. 5, the first installer terminal receives account information (for example, a BB account) about a first terminal 500 of a manager of the coffeehouse, where the eleventh camera is installed, in accordance with user input by the manager having the first terminal.

Further, the first installer terminal transmits the received account information about the first terminal (for example, the BB account), installer account information about the first installer terminal (for example, an AA installer account), and authority delegation information about the eleventh camera to the first service server (S260).

Thereafter, the service server 300 receives account information about the terminal 500 (or account information of the terminal 500) transmitted from the installer terminal 400, installer account information about the installer terminal 400 (or account information of the installer terminal 400), an authority delegation information (or authority delegation information about one or more specific camera 100 selected from a plurality of cameras managed by the installer terminal 400), and the like.

Further, the service server 300 entrusts (or changes/sets) authority (management authority) related to the relevant camera 100 from an installer account related to the installer terminal 400 to an account related to the terminal 500 on the basis of the account information about the terminal 500, the installer account information related to the installer terminal 400, and the authority delegation information.

In other words, the service server 300 links and keeps (registers) the account designated to the terminal 500 and the MAC address and activation code of the camera 100 on the basis of the account information about the terminal 500, the installer account information about the installer terminal 400, and the authority delegation information.

For example, the first service server receives the account information about the first terminal (for example, a BB account) transmitted from the first installer terminal, the installer account information (for example, an AA installer account) about the first installer terminal, and authority delegation information about the eleventh camera.

Further, as shown in FIG. 6, the first service server sets (or changes) management authority over the eleventh camera from the first installer terminal (for example, the AA installer account) to the first terminal (for example, the BB account) (S270).

Thereafter, when it is completed to entrust (or set authority/change authority/entrust management authority) authority to the terminal 500 from the installer terminal 400 in relation to the camera 100, the service server 300 transmits information that the management authority for the camera 100 has been changed from the installer terminal 400 to the terminal 500 to the installer terminal 400 and the terminal 500, respectively.

Further, the installer terminal 400 receives the information that the management authority over the camera 100 has been changed from the installer terminal 400 to the terminal 500, which is transmitted from the service server 300, and outputs the received information that the management authority over the camera 100 has been changed from the installer terminal 400 to the terminal 500.

Further, the terminal 500 receives the information that the management authority over the camera 100 has been changed from the installer terminal 400 to the terminal 500, which is transmitted from the service server 300, and outputs the received information that the management authority over the camera 100 has been changed from the installer terminal 400 to the terminal 500.

For example, when management authority over the eleventh camera is changed from the first installer terminal (for example, the AA installer account) to the first terminal (for example, the BB account), the first service server creates eleventh information that the management authority over the eleventh camera has been changed from the first installer terminal to the first terminal, and transmits the created eleventh information to the first installer terminal and the first terminal, respectively.

Further, the first installer terminal and the first terminal receive the eleventh information transmitted from the first service server, respectively, and output the received eleventh information, respectively (S280).

Thereafter, the terminal 500 connects to the service sever 300 using the account related to the relevant terminal 500.

Further, the terminal 500 outputs the video information acquired by the camera 100 and transmitted via the service server 300 from the camera 100 in cooperation with the service server 300. Here, the video information includes real-time video information acquired by the camera 100 and past video information about the camera 100 kept in the relevant service server 300.

Further, the terminal 500 performs the PTZ control function for the relevant camera 100, and a search function and a test function for several pieces of video information kept in the service server 300 in relation to the relevant camera 100 in cooperation with, the service server 300.

For example, the first terminal connects to the first service server using the account related to the relevant first terminal (for example, the BB account).

Further, the first terminal performs an operation state-checking function for the eleventh camera given management authority over an account related to the first terminal (for example, the BB account) and a real-time video information-checking function transmitted from the eleventh camera in cooperation with the first service server (S290).

As described above, according to an embodiment of the present invention, a manager having an installer terminal granted with temporal authority over the camera, can install the relevant camera, check whether the camera operates, and then, entrust/set authority over the camera to a terminal of an end-user through cooperation among the installer terminal, the terminal of the end-user, and a service server. Accordingly, convenience for a user can be improved and it is possible to more efficiently manage an installed camera.

It should be understood that the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

According to the present invention, a manager having an installer terminal having temporal authority over a camera can install the relevant camera, check whether the camera operates, and then, entrust/set the authority over the camera to a terminal of an end-user through cooperation among the installed terminal, the terminal of the end-user, and a service server. Accordingly, convenience for a user can be improved and it is possible to more efficiently manage an installed camera. Therefore, the present invention can be used in various fields including a network camera field, a CCTV monitoring system field, an object sensing field, a video field, and a server field.

What is claimed is:

1. A control method of a CCTV monitoring system for registering a camera and managing permission, the method comprising:
    transmitting a MAC address and an activation code of the camera through a monitoring server;
    keeping the MAC address and the activation code of the camera in cooperation with an account related to the monitoring server through a service server;
    setting management authority over the camera for an installer account related to an installer terminal in cooperation with the service server through the monitoring server;
    connecting the service server, in view of the MAC address and the activation code set in the camera through the camera, with the camera installed in a specific area;
    transmitting video information acquired by the camera to the service server through the camera;
    connecting the service server, in view of the installer account through the installer terminal, with the camera installed in the specific area;
    checking whether the camera having management authority over the installer account operates, through the installer terminal;
    receiving account information about a terminal of an end-user to provide management authority over a camera that is temporarily set in the installer terminal to the terminal of the end-user related to the area where the camera is installed, through the installer terminal;
    transmitting the received account information about the terminal, installer account information about the installer terminal, and authority delegation information to the service server through the installer terminal;
    setting management authority about the camera from an installer account related to the installer terminal to an account related to the terminal in view of the account information about the terminal, the installer account information about the installer terminal, and the authority delegation information, through the service server;
    transmitting information that the management authority over the camera has been changed from the installer terminal to the terminal, to the installer terminal and the terminal, respectively, through the service terminal, when management authority over the camera has been entrusted from the installer terminal to the terminal; and
    outputting information that the management authority over the camera has been changed from the installer terminal to the terminal, which is transmitted from the service server, through the installer terminal and the terminal.

2. The method of claim 1, wherein the checking of whether the camera operates includes:
    a process of receiving video information transmitted via the service server from the camera through the installer terminal;
    a process of outputting the received video information through the installer terminal; and
    a process of performing a PTZ control function on the camera in cooperation with the service server and the camera through the installer terminal.

3. The method of claim 1, further comprising:
    connecting to the service server using the account related to the terminal through the terminal;

receiving video information transmitted via the service server from the camera, through the terminal;

outputting the received video information through the terminal; and performing at least one of a PTZ control function for the camera and, a search function and a test function on a plurality of pieces of video information kept in the service server in relation to the camera in cooperation with the service server and the camera, through the terminal.

4. The method of claim 3, wherein the receiving of account information about a terminal receives the account information about the terminal through any one of user input by a manager of the installer terminal, user input by a user of the terminal, and information transmission/reception through local communication between the installer terminal and the terminal.

5. The method of claim 3, wherein the setting of management authority over the camera from an installer account related to the installer terminal to an account related to the terminal keeps the MAC address and the activation code of the camera in relation to the account related to the terminal.

6. A CCTV monitoring system for registering a camera and managing permission, the system comprising:

a monitoring server that transmits a MAC address and an activation code of a camera and sets management authority over the camera for an installer account related to an installer terminal;

the camera that is installed in a specific area, connects to a service server on the basis of the MAC address and the activation code set in the camera, and transmits video information acquired by the camera to the service server;

the installer terminal that connects to the service server in view of the installer account and checks whether the camera operates, the camera being installed in the specific area and management authority over the camera being given to the installer account; and the service server that keeps the MAC address and the activation code of the camera in cooperation with an account related to the monitoring server and sets management authority over the camera for the installer account related to the installer terminal in cooperation with the monitoring server, wherein:

the installer terminal receives account information about the terminal of the end-user and transmits the received account information about the terminal, installer account information about the installer terminal, and authority delegation information to the service server in order to provide the management authority over the camera having temporary authority over the installer terminal to the terminal, and the service server sets the management authority over the camera from the installer account related to the installer terminal to an account related to the terminal in view of the account information about the terminal, the installer account information about the installer terminal, and the authority delegation information.

7. The system of claim 6, wherein the terminal connects to the service server using the account related to the terminal, outputs video information transmitted via the service server from the camera, and performs at least any one of a PTZ control function for the camera and, a search function and a test function for a plurality of pieces of video information kept in the service server in relation to the camera, in cooperation with the service server and the camera.

* * * * *